June 12, 1962
R. RUMMEL
3,038,795
PROCESS FOR SMELTING AND REDUCING POWDERED
OR FINELY DIVIDED ORES
Filed June 2, 1959
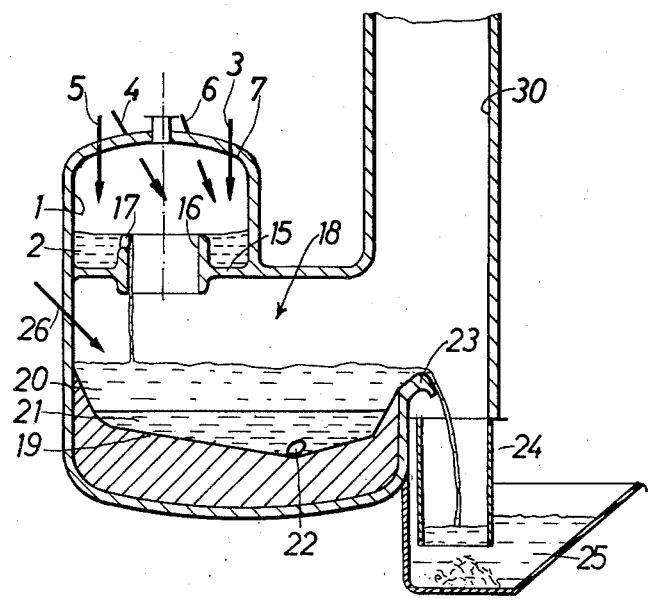
INVENTOR.
ROMAN RUMMEL
BY
*his* ATTORNEYS 3,038,795
PROCESS FOR SMELTING AND REDUCING POWDERED OR FINELY DIVIDED ORES
Roman Rummel, Daberger Weg 29, Brühl,
Bezirk Koln, Germany
Filed June 2, 1959, Ser. No. 817,516
Claims priority, application Germany June 7, 1958
3 Claims. (Cl. 75—40)

The invention relates to a process and an apparatus for smelting and reducing powdered or fine-grained ores. In particular, the present invention is concerned with the smelting of powdery or finely divided ores in two reduction steps.

In the smelting industry, e.g. in blast furnaces and converters, dusts are obtained which contain an essential proportion of metallic oxides and combustible constituents. These dusts as well as finely divided or powdered ores can be processed according to the conventional smelting processes only by a previous dressing operation, e.g. by sintering and briquetting, or by introducing the ores, fuels and additives (flux) into a liquid slag bath formed of the reactants.

The present invention is based on the discovery that the smelting and reducing of powdered and finely divided ores can be substantially improved by reducing the expenditure of heat if the ores are reduced in two steps.

In accordance with the invention, the ores, admixtures and the fuel ash are first melted and mixed with one another, and the ores are converted into a lower oxidation step, e.g. from $Fe_2O_3$ to $Fe_3O_4$ or FeO, by adding fuels in measured quantities. The slag thus formed is introduced into a slag bath wherein the ores are completely reduced in known manner by introducing reducing agents, preferably fuels.

In particular, the present invention provides a process and an apparatus for smelting and reducing powdered or finely divided ores by reduction in two steps by means of fuels. In the first reduction step the ores are smelted by adding measured quantities of fuels and gases containing free oxygen, and the metallic oxides present in the melt are converted into a lower oxidation step. The mixture thus formed is passed into another space containing a slag bath wherein the second reduction step is carried out by introducing reducing agents, preferably fuels, which effect complete reduction of the metallic oxides. The molten metal, the slag and the gases produced can then be removed from the second reduction space.

The new process of smelting finely divided ores in two reduction steps shows the considerable advantage that the expenditure of heat energy required for the two reduction steps is relatively low as compared with the prior art smelting processes.

It is preferable to use in the second reduction step fuels containing no volatile constituents in all or at a low proportion only. It is of advantage to use coke containing a low proportion of volatile constituents. The efficiency of the reduction of the metallic oxides in the molten slag bath increases as the proportion of volatile constituents in the fuel used in the complete reduction of the metallic oxide decreases. The volatile constituents separated from the fuel apparently impair the contact with the slag.

In practising the invention it is advantageous to use an excess quantity of fuel. The excess fuel which is carried off in finely divided or powdered form (flue coke) together with the gases produced in the melting and heating of the slag as well as in the reduction of the ores, can be used with advantage after separation as a fuel for the second reduction step, since this fuel is completely degasified and does not contain any volatile constituents. If flue coke is obtained in a larger quantity than required in the second reduction step, the surplus quantity can be returned to the first reduction step.

The invention will now be described with reference to the accompanying diagrammatic drawing showing by way of example a vertical longitudinal section of an apparatus which may be used to carry out the herein described process of reducing finely divided ores.

The reduction furnace shown in the drawing comprises a smelting or pre-reduction chamber 1 of circular or oval cross section, containing the slag bath 2 formed of ores, additives (fluxes) and fuel ash. The finely divided or powdered ores, additives, fuels and air are introduced through nozzles 3, 4, 5 and 6, which are provided in the vaulted ceiling 7 of chamber 1 and are extended obliquely in the direction of the slag bath so that a substantial part of the kinetic energy of the reactants is transferred to the slag bath which is thus given a rotary motion. The ores, additives and fuels are pneumatically passed to the nozzles with air or another gas serving as carrier gas. The gas column above the slag bath rotates in the same directions as the slag bath so that solid and liquid substances whirled about are flung onto the wall where they melt and run down the vertical wall into the slag bath. In the rotating slag bath, the molten substances are intimately mixed with each other and the ores are prereduced by part of the introduced fuel. After being pre-heated the air is used in the combustion of the fuel is supplied to the blast nozzle 6. A pipe 16 which determines the level of the slag bath 2 is centrally arranged at the bottom 15 of chamber 1. The upper circumference of pipe 16 has a recess 17 through which slag flows off at the rate at which new slag is formed. The slag and the gas produced are passed through pipe 16 into reduction chamber 18 which is arranged below the chamber 1.

The bottom plate 19 of the reduction chamber 18 is shaped in form of a trough which accommodates the pre-reduced slag 20 and the metal 21. At the greatest depression of the bottom plate, there is an opening 22 for tapping the metal. The height of the slag level is maintained by a weir 23; the reduced slag runs off over this weir through immersion pipe 24 into the water bath 25 where the reduced slag is granulated and continuously or periodically discharged by means of a scraper (not shown in the drawing). Fuel is introduced in excess quantities into the slag bath 20 through one or more nozzles 26. It is of advantage to use as fuel flue coke which is separated from the waste gas and returned to the reduction chamber. If the quantity of flue coke formed is insufficient for the reduction, fresh fuel can be added.

The final reduction of the pre-reduced metallic oxides is accomplished by intimate turbulence motion and mixing of fuel and slag. During this procedure, the metal drops onto the bottom and is continuously or periodically removed through the tap hole 22. The fuel fed in excess to both reduction chambers is discharged together with the waste gases. From the reduction chamber, the hot gases initially pass through a waste-heat boiler 30 provided with radiation and contact heating surfaces, wherein they give off an essential part of their sensible heat to generate high-pressure steam. As mentioned above, the flue coke is separated from the gas in a dust separator. Since the waste gas still contains gaseous constituents it is of advantage to accomplish final combustion of these gaseous constituents in a series-connected waste-heat boiler by introducing pre-heated secondary air. The gas thus produced can be further used in known manner.

The walls of the pre-reduction chamber and the final reduction chamber are preferably formed of pipes provided with pins; and water is passed through these pipes. The walls are protected against excessive heat transfer by a deposit of slag formed by the cooling effect of the pipes. Only the trough of the reduction chamber accommodating the metal bath is provided with a lining. The cooling pipes of the chambers 1 and 18 can be combined e.g. with the waste-heat boiler 30 to form a boiler system through which the water to be evaporated is passed in a forced passage or forced cycle or natural cycle or in a combination of such passages.

The pre-reduction chamber may be constructed as a cyclone or smelting muffle as used e.g. in conventional boiler plants. In the aforedescribed embodiment of an apparatus adapted to carry out the process of the invention, the pre-reduction chamber is arranged above the final reduction chamber. It is however possible, as well, to arrange the pre-reduction chamber and the final reduction chamber side by side.

The gas produced in the first and the second reduction steps must not be used for combustion and steam generation, however, it is as possible to use this gas for other purposes by exploitation of the heat of the gas. For example, this gas can be used for degasifying and, if necessary, drying bituminous fuels in the production of flue coke which can be used in the herein described reduction process. If, in addition to the production of metals, it is desired to obtain nitrogen-poor gases to be used e.g. as synthesis gas, oxygen-enriched air or oxygen, if desired, in admixture with endothermic gasifying agents, such as steam and carbon dioxide, can be used instead of air as combustion or degasifying agents.

The process of the invention can be carried out with solid, liquid and gaseous fuels. Solid bituminous fuels containing a relatively large proportion of volatile constituents are preferably degasified according to the invention before being used in the reduction of the slag, e.g. by introducing them into the hot waste gas stream behind the reduction chamber. The degasification of said solid bituminous fuels is accomplished in suspension by absorbing part of the sensitive heat of the waste gas. Thereupon the fuels are separated from the gas in a separator from where they are passed to the reduction chamber and, if desired, to the pre-reduction chamber. The aforesaid procedure may be combined with drying of the fuel.

In general, the process of the invention produces metal and, as by-products, steam and, if desired, lean gas, water gas or synthesis gas. The new process has the particular advantage that the quantity of the by-products formed does not depend on the amount of metal produced, but can be varied at will by increasing the amounts of fuels. Besides, it is possible to diminish the rate of ore or to discontinue charging ore without reducing thereby the production rate of steam or/and gas. Thus, the process of the invention can be varied within wide limits as regards the production rate of the main products and by-products.

The process of the invention is further illustrated in the following example without being restricted thereto.

*Example*

Raw steel and steam were produced at a pressure of 74 atmospheres and 450° C. (superheating) from finely divided crude pig-iron ore with the addition of forge coal containing about 14.5 percent of volatile constituents and an ash content of 13 percent.

1.85 tons of crude pig-iron ore containing 74 percent of $Fe_2O_3$, 0.566 ton of powdered limestone, 2.47 tons of forge coal and 16,500 standard cubic meters of air, preheated to 400° C., were introduced per hour into a smelting and pre-reduction chamber having an inside diameter of 1.5 meters. In the chamber the ore, the additive (flux) and an essential portion of the fuel slag were melted with combustion at a moderate excess quantity of fuel, intimately mixed with one another, and the $Fe_2O_3$ was reduced for the most part in the resulting slag to FeO. The slag running off into the (final) reduction chamber had the following composition:

| | Percent by weight |
|---|---|
| $Fe_2O_3$ | 13.7 |
| FeO | 42.7 |
| $SiO_2$ | 23.8 |
| $Al_2O_3$ | 4.0 |
| CaO | 14.6 |
| Various constituents | 1.2 |

In this process, the temperature of the slag and the gas was above 1700° C.

0.39 ton per hour of forge coal were introduced into the (final) reduction chamber having about twice the sectional area of the pre-reduction chamber, and 0.235 ton per hour of flue coke were returned to the reduction chamber from a dust separator. The iron oxides of the slag were reduced to raw steel which was periodically removed from the relatively small chamber. The reduced slag ran off at the end of the chamber via an overflow gutter into a water bath and was continuously discharged in granulated form from the slag trough by means of a scraper.

The finely divided ore, additive (flux), forge coal and flue coke are fed to the pre-reduction chamber and the final reduction chamber pneumatically with about 150 standard cubic metres of compressed air at a pressure of 2 atmospheric gauge.

1 ton of raw steel and 0.99 ton of slag of the following composition were obtained per hour.

| Raw steel: | Percent by weight |
|---|---|
| Fe | 97.0 |
| C | 0.2 |
| Si | 2.5 |
| P | 0.1 |
| S | 0.1 |
| Slag after reduction: | |
| FeO | 4.3 |
| $SiO_2$ | 50.7 |
| $Al_2O_3$ | 9.4 |
| CaO | 34.3 |
| Various constituents | 1.3 |

The waste gas passed off at a temperature of 1600° C. into a waste-heat boiler, arranged at the end of the reduction chamber, wherein it gave off its sensible heat down to a temperature of 300° C. In the dust separator, 0.235 ton of flue coke was separated per hour and returned to the reduction chamber.

By introducing per hour 5700 standard cubic meters of air, which was preheated to 400° C. in an air pre-heater, into a second waste-heat boiler, complete combustion of the combustible gaseous constituents contained in the waste gas was achieved. The flue gases which were thereby heated up to about 900° C. were used to superheat the steam generated in the boiler system, to preheat the primary and secondary air as well as to preheat the feed water.

19.95 tons of steam of a pressure of 74 atmospheres and a temperature of 450° C. were generated.

I claim:

1. Process for smelting and reducing finely divided ores which can be reduced in the molten state by reduction in two steps, which comprise introducing fuels, gases containing free oxygen, and said ores in measured quantities into a first reduction zone, smelting the ores by combustion of a part of said fuels to form a molten ore bath, said ores, fuels, and free oxygen containing gases being blown in tangentially whereby the molten ore bath is kept in rotary motion and thoroughly mixed, reducing the metallic oxides present in the molten bath with the other part of said fuels to a lower oxidation state, passing the mixture formed and the hot gases into a second reduction zone containing a slag bath whereby said gases heat the slag, blowing fuels into said slag bath as reducing agents to effect complete reduction of said metallic oxides, and removing the molten metal, the slag and the gases from said second reduction zone.

2. Process as claimed in claim 1 wherein unreacted solid fuel in the gas produced is separated and fed in portions to the first and second reduction zone.

3. Process as claimed in claim 1, wherein the complete reduction in the second reduction space is accomplished with coke which is substantially free of volatile constituents.

References Cited in the file of this patent

UNITED STATES PATENTS

| | | |
|---|---|---|
| 861,593 | De Laval | July 30, 1907 |
| 1,319,061 | Garred | Oct. 21, 1919 |
| 1,422,733 | Bradley | July 11, 1922 |
| 1,815,888 | Bailey | July 28, 1931 |
| 1,815,899 | Brassert | July 28, 1931 |
| 2,182,009 | Wiberg | Dec. 5, 1939 |
| 2,184,300 | Hodson et al. | Dec. 26, 1939 |
| 2,320,206 | Engel et al. | May 25, 1943 |
| 2,560,470 | Ogorzaly | July 10, 1951 |
| 2,814,561 | Erasmus | Nov. 26, 1957 |
| 2,865,734 | Klemantaski | Dec. 23, 1958 |